UNITED STATES PATENT OFFICE 2,581,397

AMINO ACID SALTS OF MERSALYL AND METHOD OF PREPARING THE SAME

Wolffe Harry Feinstone, Seymour, Ind., assignor to The Central Pharmacal Company, Seymour, Ind., a corporation of Indiana No Drawing. Application April 29, 1949, Serial No. 90,547

12 Claims. (Cl. 260—434)

The present invention relates to a pharmaceutical composition and a method for preparing the same, and it particularly relates to derivatives of Mersalyl and a method for preparing these derivatives.

The acid form of Mersalyl, also known as Salyrgan, is chemically identified as ortho (hydroxymercurimethoxypropylcarbamyl) phenoxy acetic acid. The Mersalyl acid has the following structure:

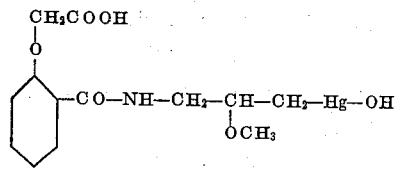

The drug is normally used in the form of its alkali metal salt, and is normally used in diuretic compositions.

While the Mersalyl drugs have been used alone, administration of the drugs by themselves has not been found too desirable inasmuch as some of the salts of Mersalyl, such as sodium Mersalyl, tend to deteriorate and to precipitate mercury, both on standing and in the human system.

To overcome this objection, it has been previously suggested to combine Mersalyl drugs with other diuretic drugs such as theophylline. This combination has been found to produce less reaction on intramuscular or intravenous injection than does the use of Mersalyl alone. The combination of Mersalyl with theophylline is widely used as a diuretic for dropsy in cardiorenal disease and in nephrosis, ascites of liver diseases and other conditions. The combination of Mersalyl and theophylline apparently permits more rapid resorption of Mersalyl, thus accelerating diuresis. In addition, the deposition of mercury is prevented, thus improving the local tolerance.

To my knowledge, however, there are no known derivatives of Mersalyl which are capable of themselves to be stored for indefinite periods of time without depositing mercury. In addition, the presently used derivatives of Mersalyl, such as sodium Mersalyl, are very unstable in the presence of air since they are extremely hygroscopic.

Another undesirable characteristic of conventional mercurial diuretic drugs is the fact that they cause pain in the patient at the site of the injection. The compounds of the present invention appear to overcome this disadvantage, as the drugs of the present invention may be injected intramuscularly without discomfort to the patient.

An object of the present invention is to provide derivatives of Mersalyl which have the ability to stand for extended periods of time without depositing mercury.

Another object of the invention is to provide salts of Mersalyl which are far less hygroscopic than previously known Mersalyl derivatives.

A further object of the present invention is to provide derivatives of Mersalyl which are less toxic than sodium Mersalyl containing an equivalent amount of Mersalyl.

Another object of the present invention is to provide a mercurial diuretic which can be injected without the appearance of a burning sensation previously associated with the hypodermic injection of mercurial diuretics.

Another object of the invention is to provide a method for preparation of novel derivatives of Mersalyl.

The present invention is particularly directed to the preparation of aliphatic amino acid salts of Mersalyl. More particularly, the compounds of the present invention are salts of Mersalyl reacted with an aliphatic amino acid having from two to five carbon atoms per molecule, and having at least one carboxyl group of the amino acid neutralized by a basic ion selected from the group consisting of the alkali and alkaline earth metal salts and the ammonium ion. The preferred aliphatic amino acids are glycine, glutamic acid, and alanine.

The sodium, potassium, lithium, ammonium and calcium salts of the aliphatic amino acid-Mersalyl compounds are decreasingly hygroscopic in the order listed, the calcium salt being remarkably stable, and being capable of remaining perfectly dry upon extended exposure to air. The sodium salt is somewhat more hygroscopic, but may be used with good results where the composition is to be used in the form of a solution for injection or in tablet form.

All of the above salts have the ability to stand for indefinite periods of time without disintegrating and precipitating mercury therefrom. In addition, they are less hygroscopic than previously prepared derivatives of Mersalyl. Even more important is the fact that tests have shown that the toxicity of the novel derivatives herein described is substantially less than the toxicity of sodium Mersalyl, so that larger amounts of Mersalyl may be introduced into the system without ill effects. In many cases the drugs of the present invention have been found to be the only mercurial diuretic which can be tolerated by sensitive patients.

The amino acid derivatives proposed in the present invention are compatible with other diuretic agents such as theophylline.

The compounds of the present invention may be prepared by reacting Mersalyl acid with the appropriate aliphatic acid in equimolar proportions in the presence of one-half to about two molecular proportions of the neutralizing agent. The solution which results from the reaction may be precipitated by means of organic reagents such as acetone, and the stable precipitate recovered after subsequent washing.

Other organic reagents than acetone, such as isopropanol, may be used to effect precipitation of the aliphatic amino acid salts of Mersalyl.

The following examples illustrate the preparation of the various salts of the present invention:

EXAMPLE I

The sodium glycinate salt of Mersalyl 3.7 grams (.05M) of glycine were dissolved in 50 cc. of a 1-molar solution of sodium hydroxide (.05M) in absolute methanol. The solution was somewhat turbid due to the low solubility of sodium glycinate in methanol. On the addition of 24.10 grams (.05M) of Mersalyl acid, almost complete solution resulted. The small undissolved portion was removed by filtration and the filtrate was added to 100 cc. of dry acetone, resulting in the precipitation of the crystalline sodium glycinate salt of the Mersalyl acid. The precipitate was collected, washed with acetone and dried in a desiccator.

EXAMPLE II

The potassium glycinate salt of Mersalyl 1.87 grams (.025M) of glycine were dissolved in 50 cc. of a 1-molar solution of potassium hydroxide (.05M) in absolute methanol. On the addition of 12.05 grams (.025M) of Mersalyl acid, almost all of the material reacted and was dissolved. The small amount of unreacted residue was discarded after filtration and the remaining filtrate was added to dried acetone to precipitate the potassium glycinate salt of Mersalyl. This precipitate was washed with acetone and subsequently dried in a desiccator.

EXAMPLE III

The ammonium glycinate salt of Mersalyl 3.7 grams of a 28% solution of ammonium hydroxide (.025M) and 1.87 grams (.025M) of glycine were dissolved in 30 cc. of ethanol, and 12.0 grams (.025M) of Mersalyl acid were added to the reaction mixture. The small amount of unreacted solid material was removed by filtration, and the filtrate was added to acetone, whereupon the ammonium glycinate salt of Mersalyl precipitated. This compound was washed with acetone, and dried.

EXAMPLE IV 0.7 grams (.0125M) of calcium oxide in the form of unslaked lime and 1.87 grams (.025M) of glycine were dissolved in 10 cc. of water. Thereupon 12.0 grams (.025M) of Mersalyl acid were added. The reaction resulted in almost complete solution and the small amount of unreacted material was filtered off and discarded. The resulting filtrate was added to acetone to precipitate the calcium glycinate salt of Mersalyl.

EXAMPLE V

Lithium glycinate salt of Mersalyl

.09 gram (.0375M) of lithium hydroxide and 5.6 grams (.075M) glycine were added to 30 cc. of distilled water. 36 grams (.075M) of Mersalyl acid were added to the resulting solution, the unreacted material then being filtered off and discarded. The filtrate was added to dry acetone to precipitate the lithium glycinate salt of Mersalyl which was collected and dried in a desiccator.

The above reactions were carried out at room temperature. The reactions may be carried out in distilled water or methanol, or other suitable solvent for the metal glycinate salt of Mersalyl.

While the above examples describe the preparation of the glycine salts, it is also possible to form similar Mersalyl salts from aliphatic amino acids such as glutamic acid and alanine.

As mentioned previously, the Mersalyl derivatives proposed in the present invention may be used alone, but it is sometimes preferable to compound the same with theophylline derivatives. In this respect, I prefer to compound the Mersalyl derivatives with the theophylline-sodium glycinate salts described in U. S. Patent No. 2,433,765, issued December 30, 1947, to John C. Krantz, Jr. and James M. Holbert. The following example illustrates the preparation of tablets containing Mersalyl sodium glycinate with theophylline sodium glycinate.

EXAMPLE VI 1 mole of sodium hydroxide was dissolved in about 55 cc. of methanol, to which was added 1 mole of glycine. Mersalyl acid was then added and reacted until solution was complete, or nearly complete. Small amounts of a 1/10 normal sodium hydroxide solution and glycine were added until the solution was entirely complete. Then, theophylline sodium glycinate, together with excipients such as calcium carbonate, were added to the mixture, which was then dried, forced through a suitable size sieve, and compressed into tablets in the conventional type of tableting machine.

The following example describes the preparation of a composition for injection purposes.

20 grams of sodium hydroxide and 17.5 grams of glycine were dissolved in 400 cc. of distilled water. To the resulting solution were added 50 grams of Mersalyl acid and 25 grams of theophylline. The resulting solution contained both the sodium glycinate salt of Mersalyl and the sodium glycinate salt of theophylline. The solution was made up to a volume of 500 cc., filtered to remove minute quantities of undissolved solids and foreign particles, dispensed into ampuls, sealed, and sterilized in accordance with the conventional techniques for the preparation of injectable solutions.

It will be evident that many variations may be made through a wide range without departing from the principles of this invention, and it is, therefore, not the purpose to limit the patent granted hereon otherwise than necessitated by the scope of the appended claims.

I claim as my invention:

1. An aliphatic amino acid salt of ortho (hydroxymercurimethoxypropylcarbamyl) phenoxy acetic acid.

2. An aliphatic amino acid salt of ortho (hydroxymercurimethoxypropylcarbamyl) phenoxy acetic acid having at least one carboxyl group of said amino acid neutralized by a basic ion selected from the group consisting of the alkali and alkaline earth metal ions and the ammonium ion.

3. An aliphatic amino acid salt of ortho (hydroxymercurimethoxypropylcarbamyl) phenoxy acetic acid, said amino acid substituent containing from 2 to 5 carbon atoms.

4. An aliphatic amino acid salt of ortho (hydroxymercurimethoxypropylcarbamyl) phenoxy acetic acid having at least one carboxyl group of said amino acid neutralized by a basic selected from the group consisting of the alkali and alkaline earth metal ions and the ammonium ion, said aliphatic amino acid constituent containing from 2 to 5 carbon atoms.

5. A calcium aliphatic amino acid salt of ortho (hydroxymercurimethoxypropylcarbamyl) phenoxy acetic acid, the amino acid substituent containing from 2 to 5 carbon atoms.

6. An aliphatic amino salt of ortho (hydroxymercurimethoxypropylcarbamyl) phenoxy acetic acid, the amino acid substituent thereof containing from 2 to 5 carbon atoms and having a basic substituent selected from the group consisting of the alkali and alkaline earth metals and the ammonium radical.

7. An ammonium aliphatic amino acid salt of ortho (hydroxymercurimethoxypropylcarbamyl) phenoxy acetic acid, the amino acid substituent thereof containing from 2 to 5 carbon atoms.

8. A calcium glycinate salt of ortho (hydroxymercurimethoxypropylcarbamyl) phenoxy acetic acid.

9. A glycinate salt of ortho (hydroxymercurimethoxypropylcarbamyl) phenoxy acetic acid, the basic constituent of the salt having been selected from the group consisting of the alkali and alkaline earth metals and ammonium.

10. An ammonium glycinate salt of ortho (hydroxymercurimethoxypropylcarbamyl) phenoxy acetic acid.

11. The method of preparing a stable salt of ortho (hydroxymercurimethoxypropylcarbamyl) phenoxy acetic acid which comprises reacting ortho (hydroxymercurimethoxypropylcarbamyl) phenoxy acetic acid with an aliphatic amino containing from 2 to 5 carbon atoms in the presence of a neutralizing agent containing ions selected from the group consisting of the alkali and alkaline earth metal ions and the ammonium ion, precipitating the resulting amino acid salt of ortho (hydroxymercurimethoxypropylcarbamyl) phenoxy acetic acid and recovering said precipitate.

12. The method of preparing a stable salt of ortho (hydroxymercurimethoxypropylcarbamyl) phenoxy acetic acid which comprises reacting one molecular proportion of ortho (hydroxymercurimethoxypropylcarbamyl) phenoxy acetic acid with one molecular proportion of an aliphatic amino acid containing from 2 to 5 carbon atoms in the presence of from ½ to 2 molecular proportions of a neutralizing agent containing ions selected from the group consisting of the alkali and alkaline earth metal ions and the ammonium ions, precipitating the resulting amino acid salt of ortho (hydroxymercurimethoxypropylcarbamyl) phenoxy acetic acid, and recovering said precipitate.

WOLFFE HARRY FEINSTONE.

REFERENCES CITED

The following references are of record in the file of this patent:

UNITED STATES PATENTS

| Number | Name | Date |
| --- | --- | --- |
| 978,145 | Engelmann | Dec. 13, 1910 |
| 1,693,432 | Bochmuhl et al. | Nov. 27, 1928 |